United States Patent
Anderson

(10) Patent No.: US 10,026,247 B2
(45) Date of Patent: Jul. 17, 2018

(54) REQUEST TO EXIT TWO-WIRE CONTROL MODULE

(71) Applicant: Hanchett Entry Systems, Inc., Phoenix, AZ (US)

(72) Inventor: Eric Anderson, Tempe, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 203 days.

(21) Appl. No.: 15/202,169

(22) Filed: Jul. 5, 2016

(65) Prior Publication Data

US 2017/0092029 A1    Mar. 30, 2017

Related U.S. Application Data

(60) Provisional application No. 62/188,983, filed on Jul. 6, 2015, provisional application No. 62/210,720, filed on Aug. 27, 2015.

(51) Int. Cl.
   *G07C 9/00* (2006.01)
   *H01H 9/00* (2006.01)
   *G05B 19/042* (2006.01)

(52) U.S. Cl.
   CPC ....... *G07C 9/00126* (2013.01); *G05B 19/042* (2013.01); *H01H 9/00* (2013.01); *G05B 2219/2628* (2013.01)

(58) Field of Classification Search
   CPC .. E05B 47/06; E05B 2047/0061; E05B 17/22; G07C 9/00126; H01H 9/00
   See application file for complete search history.

(56) References Cited

U.S. PATENT DOCUMENTS

| | | | |
|---|---|---|---|
| 5,022,069 A | 6/1991 | Chen | |
| 5,588,037 A | 12/1996 | Fuller et al. | |
| 8,225,024 B2 | 7/2012 | Dybsetter | |
| 2008/0209228 A1* | 8/2008 | Chandler | G07C 9/00174 713/186 |
| 2009/0025435 A1* | 1/2009 | Popowski | E05B 47/06 70/91 |
| 2010/0201479 A1* | 8/2010 | Popowski | E05B 47/06 340/5.7 |
| 2012/0212001 A1* | 8/2012 | Benitez | E05B 17/22 292/251.5 |

* cited by examiner

*Primary Examiner* — Nabil Syed
(74) *Attorney, Agent, or Firm* — Woods Oviatt Gilman LLP; Ronald J. Kisicki, Esq.

(57) ABSTRACT

A REX activation detection and control module system configured to allow a REX device having at least four connectors to electrically connect with ACS devices having at least four connectors, while only connecting two wires to the REX device. The system comprises a first REX input/output device comprising two couplings and a second REX input/output device comprising at least four couplings. The system also comprises a current sense amplifier electrically connected to the first REX input/output device, the current sense amplifier configured to measure current from either the first REX input/output device. The system also comprises a microcontroller electrically connected to the current sense amplifier, the microcontroller configured to monitor the rolling average of the measured current output from the current sense amplifier. When the microcontroller detects an anomaly within the rolling average of the measured current, the microcontroller will activate the relay.

19 Claims, 19 Drawing Sheets

FIG. 2.

REQUEST TO EXIT TWO-WIRE CONTROL MODULE

CROSS-REFERENCE TO RELATED APPLICATIONS

This application claims the benefit of U.S. Provisional Patent Application No. 62/188,983, filed on Jul. 6, 2015 and U.S. Provisional Patent Application No. 62/210,720, filed Aug. 27, 2015, both of which are hereby incorporated by reference in their entirety.

TECHNICAL FIELD

The present invention relates to releasable door access control system (ACS) devices; more particularly, to request to exit (REX) activation detectors and control modules that offer the ability to electrically connect REX devices having four to five connecting wires to ACS devices having at least four connecting wires while only connecting two wires to the REX devices; and most particularly, to such a system comprising a current sense amplifier configured to measure current from a first REX input/output device and a microcontroller configured to monitor the rolling average of the measured current output delivered from the current sense amplifier.

BACKGROUND OF THE INVENTION

It is known in the art of security and electrically-controlled locks to use access control systems to monitor, regulate, and restrict access to buildings or other objects (e.g. safes, automobiles, and the like). In many instances, these systems connect with REX devices that trigger a door latch (or the equivalent) upon the demand by a user desiring ingress/egress to/from the building/object. A shortcoming of many of these systems already in the field is that they consist of four to five connecting wires to allow for an electrical connection with certain REX devices. These wires typically include a DC Positive, DC Negative, Relay Common (CO), Relay Normally Open (NO), and the Relay Normally Closed (NC). However, the infrastructure in which they are installed (i.e. the buildings or other objects) normally comprise two connecting wires, typically the DC Positive and DC Negative. As such, interconnectivity problems occur when attempting to connect these systems with the REX devices. The non-coupling of the Common, NO, and NC connecting wires leave these live wires open in such a way that renders the access control system incompatible with the REX devices.

To repair this issue, users are forced to retrofit the building/object with compatible wires, which can be a very costly and time consuming endeavor. What is needed in the art is a converter module that allows access control systems consisting of either four or five connecting wires to be able to electrically connect with REX devices through only two wires of its at least four connecting wires. What is further needed in the art is such a system comprising a current sense amplifier configured to measure current from a first REX input/output device and a microcontroller configured to monitor the rolling average of the measured current output delivered from the current sense amplifier.

It is a principal object of the present invention to provide a system that allows an electrical connection between access control systems and REX devices having four or five connecting wires with buildings/objects having only two connecting wires installed throughout.

SUMMARY OF THE INVENTION

Briefly described, the present invention provides a REX activation detection and control module system which is configured to allow a REX device having at least four connectors to electrically connect with ACS devices having at least four connectors, while only connecting two connectors to the REX device. The system comprises a first REX input/output device, a second REX input/output device, a current sense amplifier, a microcontroller, and a relay. The first REX input/output device comprises two couplings. The second REX input/output device comprises at least four couplings and is electrically connected to the relay. The current sense amplifier is electrically connected to both the first REX input/output device and the second REX input/output. The current sense amplifier is configured to measure current from the first REX input/output device. The microcontroller is electrically connected to the current sense amplifier and the relay as well as being configured to monitor the rolling average of the measured current output from the current sense amplifier. When the microcontroller detects an anomaly within the rolling average of the measured current, the microcontroller will activate the relay.

The system may be located so as to be inaccessible from a non-secure side of a door. The relay may also be a Form C contact relay that comprises a transistor and combination contact. The transistor is electrically connected to the microcontroller. The combination contact is electrically connected to the transistor and has a Normally Open-Common-Normally Closed (NO-C-NC) configuration set to default in the NC position. The microcontroller toggles the combination contact to the NO position via the transistor.

The system may further comprise a REX detector located on the non-secure side of the door. The REX detector may be configured to send a signal to the first REX input/output device so as to create the anomaly within the rolling average of the current output. The system may comprise a fused protector that is electrically connected to both the second REX input/output device and the current sense amplifier. The fused protector may be configured to cutoff power to the system, when the voltage output from the first and/or the second REX input/output device exceeds a maximum threshold. The system may comprise a programming port which is configured to allow a user to upload system instructions into the microcontroller. The system may comprise a plurality of LED indicators which are configured to indicate the operational status of the system. The system may comprise an EMI Filter configured to substantially remove electromagnetic induction and/or electromagnetic radiation disturbances within the system. The system may also comprise a power supply circuit configured to supply power to the microcontroller and the current sense amplifier.

In accordance with another aspect of the present invention, a REX activation detection and control module system configured to allow a REX device having at least four connectors to electrically connect with ACS devices having at least four connectors, while only connecting two connectors to said REX devices is presented. The system comprises a first REX input/output device, a second REX input/output device, a current sense amplifier, a microcontroller, a Form C contact relay, a REX detector, an EMI Filter, and a plurality of LED indicators. The first REX input/output device comprises two couplings. The second REX input/output device comprises at least four couplings and is electrically connected to the Form C contact relay. The current sense amplifier is electrically connected to the first REX input/output device. The current sense amplifier is configured to measure current from the first REX input/output device.

The microcontroller is electrically connected to the current sense amplifier and the relay as well as being configured to monitor the rolling average of the measured current output from the current sense amplifier. When the microcontroller detects an anomaly within the rolling average of the measured current, the microcontroller will activate the Form C contact. The REX detector is configured to send a signal to the first REX input/output device, so as to create the anomaly within the rolling average of the current output. The EMI Filter is configured to substantially remove electromagnetic induction and/or electromagnetic radiation disturbances in the system. The plurality of LED indicators is configured to indicate the operational status of the system.

The Form C contact relay comprises a transistor and a combination contact. The transistor is electrically connected to the microcontroller. The combination contact has a Normally Open-Common-Normally Closed (NO-C-NC) configuration, which is set to default in the NC position. The combination contact is electrically connected to the collector of the transistor. The microcontroller toggles the combination contact to the NO position upon sending current to the base terminal of the transistor.

The REX detector may be located so as to be inaccessible from the non-secure side of the door and the system may be located on a secure side of the door. In accordance with an aspect of the present invention, the system may further comprise a fused protector electrically connected to both the second REX input/output device and the current sense amplifier. The fused protector may be configured to cutoff power to the system, when the voltage output from the first and/or the second REX input/output device exceeds a maximum threshold. The system may comprise a programming port which is configured to allow a user to upload system instructions into the microcontroller. The system may comprise a power supply circuit configured to supply power to the microcontroller and the current sense amplifier.

In accordance with a further aspect of the present invention, a method of electrically connecting ACS devices and for controlling ACS devices by a REX detector having at least four connectors to devices having at least four connectors, while only connecting two connectors to the REX detectors via a REX activation detection and control module system is presented. The REX activation detection and control module system of this method includes a first REX input/output device, a second REX input/output device, a current sense amplifier, a microcontroller, and a relay. The first REX input/output device comprises two couplings. The second REX input/output device comprises at least four couplings and is connected to a relay. The current sense amplifier electrically connected to both the first REX input/output device and the second REX input/output. The microcontroller is electrically connected to the current sense amplifier. The method comprises the steps of—providing a REX detector having two connectors; connecting the REX detector to the first REX input/output device; delivering a current to the current sense amplifier; measuring the delivered current via the current sense amplifier; monitoring the rolling average of the measured current output from the current sense amplifier via the microcontroller; delivering a signal to the current sense amplifier so as to create an anomaly within the rolling average of the measured current; and activating a relay upon detection of the anomaly by the microcontroller.

The current delivered to the current sense amplifier of the method may be from the output of the first REX input/output device. The method may further comprise the step of cutting off power to the system via a fused protector, when the voltage output from the first and/or second REX input/output device exceeds a maximum threshold. The method may further comprise the step of removing electromagnetic induction and/or electromagnetic radiation disturbances in the system via an EMI Filter. The method may also further comprise the step of indicating the operational status of the system via a plurality of LED indicators.

Numerous applications, some of which are exemplarily described below, may be implemented using the present invention.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

In general, the system and method described herein for allowing electrical connections in accordance with the present invention may be implemented in a variety of embodiments and methods.

Access control systems may be used to monitor, regulate and restrict access to buildings or other objects. Typically, a REX device, such as a biometric reader, a smart card reader, or the like, is located on a non-secure side of a securable closure, such as a building. A control module system, that may receive an electrical signal from the REX device and capable of releasing an associated ACS, such as an electrically controlled lock, is located so as to be inaccessible from the non-secure side.

Figure 1:
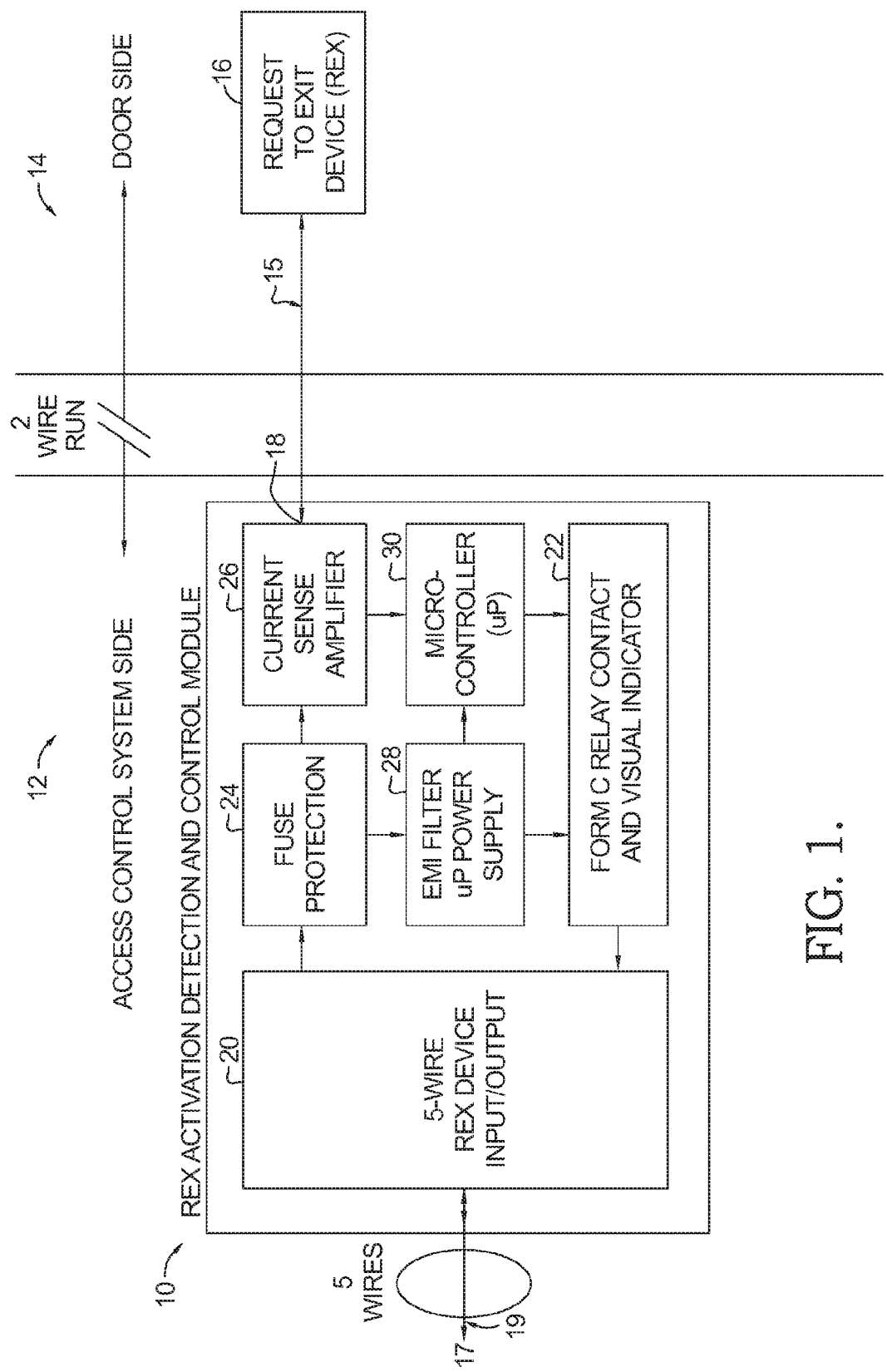
FIG. 1 is a block diagram of a REX activation detection and control module system incorporating an embodiment of a Request to Exit device, in accordance with the present invention.

Referring now to the drawings, FIG. 1 shows a REX device 16 mounted on a non-secure side of door 12 of a securable closure. REX device 16 comprises four to five connecting wires. REX activation detection and control module system 10 (hereinafter "system") is mounted on an opposite side of door 12. System 10 is a converter that is configured to allow only two of the connecting wires of REX device 16 to electrically connect with one or more ACS devices, shown schematically as 17, having configurations of four or five connecting wires, both of which may initiate the system to activate the one or more ACS devices and unlock the door. Two of the connecting wires from the REX device 16 may connect to the existing connecting wires in the infrastructure and these existing connecting wires make the connection with the system 10. The system is configured to support REX Devices 16 drawing currents typically around 5 amperes or less and may be capable of supporting multiple REX devices 16. The system 10 may also be physically scaled and/or incorporate a sensitivity control to meet the specific needs of the installation (i.e. user requirements and/or environmental requirements). It should be understood that the REX device may be, but is not limited to, a Passive Infrared (PIR) detector, Range-Controlled Radar (RCR) sensor, smart card reader, biometric reader, push button controller, electronic locksets, or any combination thereof. Moreover, the connectors may be shielded. It should be understood that the system may be configured to support REX Devices 16 drawing currents greater than 5 amperes in certain circumstances.

In accordance with an aspect of the present invention, two of the connecting wires 15 of the REX Device 16 connect to the system 10 through the couplings of a first REX input/output device 18. Existing connecting wires from the infrastructure may also be used to connect the two connecting wires of the REX Device 16 to system 10. The four/five connectors 19 of the ACS devices connect to the system 10 through the couplings of a second REX input/output device 20. The second REX input/output device 20 typically comprises four or five couplings, depending on the specifics of the connectors of the ACS devices and allows the system to receive a continuous voltage typically ranging from 9 VDC to 36 VDC. As discussed below, the second REX input/output device 20 is also electrically connected to a relay 22 (such as, but not limited to, a Form C dry contact relay). It should be understood that the second REX input/output device 20 could allow the system to receive a continuous voltage much greater than 36 VDC.

Interposed between the second REX input/output device 20 and the rest of the system 10 may be a fused protector 24. The fused protector 24 is designed to cutoff power to the components of the rest of the system 10, whenever a voltage surge in excess of the typical 36 VDC maximum threshold is received by either REX input/output device 18/20. The fused protector 24 may be electrically connected to a current sense amplifier 26 and may also be electrically connected to an EMI Filter 28. In accordance with another aspect of the present invention, the current sense amplifier 26 is electrically connected to the first REX input/output device 18 and is configured to measure current from the REX device 16. When incorporated into the system 10, the EMI Filter 28 is designed to remove artificial and natural electromagnetic induction and/or electromagnetic radiation disturbances entering the system 10 from the surrounding environment. A power supply circuit may be incorporated to supply power to a microcontroller 30 and the current sense amplifier 26 (or other components).

In accordance with another aspect of the present invention, the microcontroller 30 is electrically connected to the current sense amplifier 26 and the relay 22. The microcontroller 30 takes the measured current at the output of the current sense amplifier 26 and creates as well as monitors the rolling average of the current. Whenever egress is requested via the REX Device 16, a communication signal (analog or digital) is sent to the current sense amplifier via the first REX input/output device 18. This signal induces a transitory and substantial increase in the current measured by the current sense amplifier 26 (FIG. 3A), in turn creating an anomaly in the rolling average of the measured current monitored by the microcontroller 30. While the anomaly is being detected, the microcontroller 30 will activate the relay 22 and temporarily unlock the locking mechanism on the door/door frame (not shown). It should be understood that the system 10 may also detect signals that induce a transitory and substantial decrease in the current measured by the current sense amplifier 26 (FIG. 3B). The microcontroller 30 may also be programmed to incorporate a current profile recognition capability, to allow for recognition of REX devices that use features such as facial/speech recognition biometrics.

Figure 2:
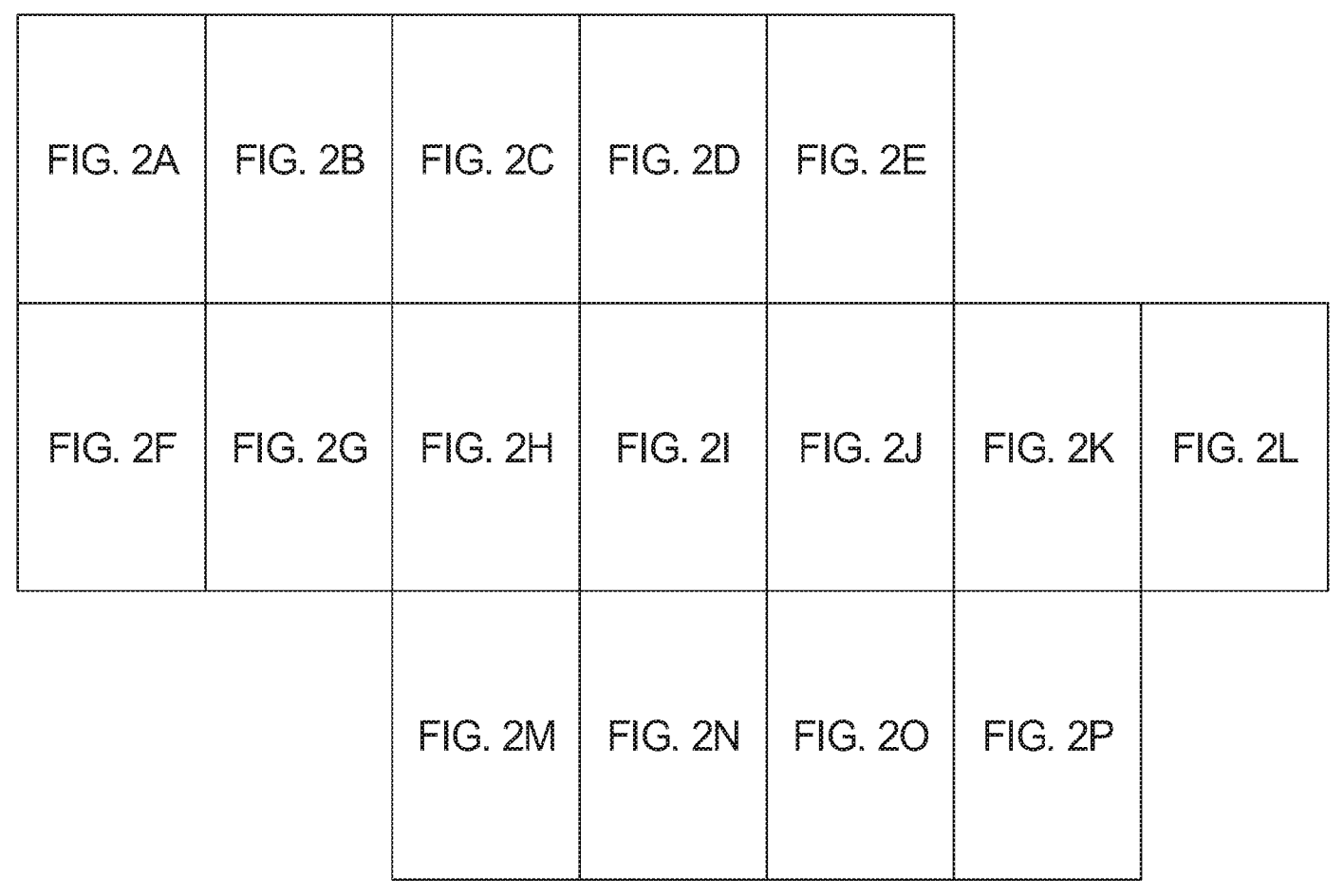
Figure 2A:
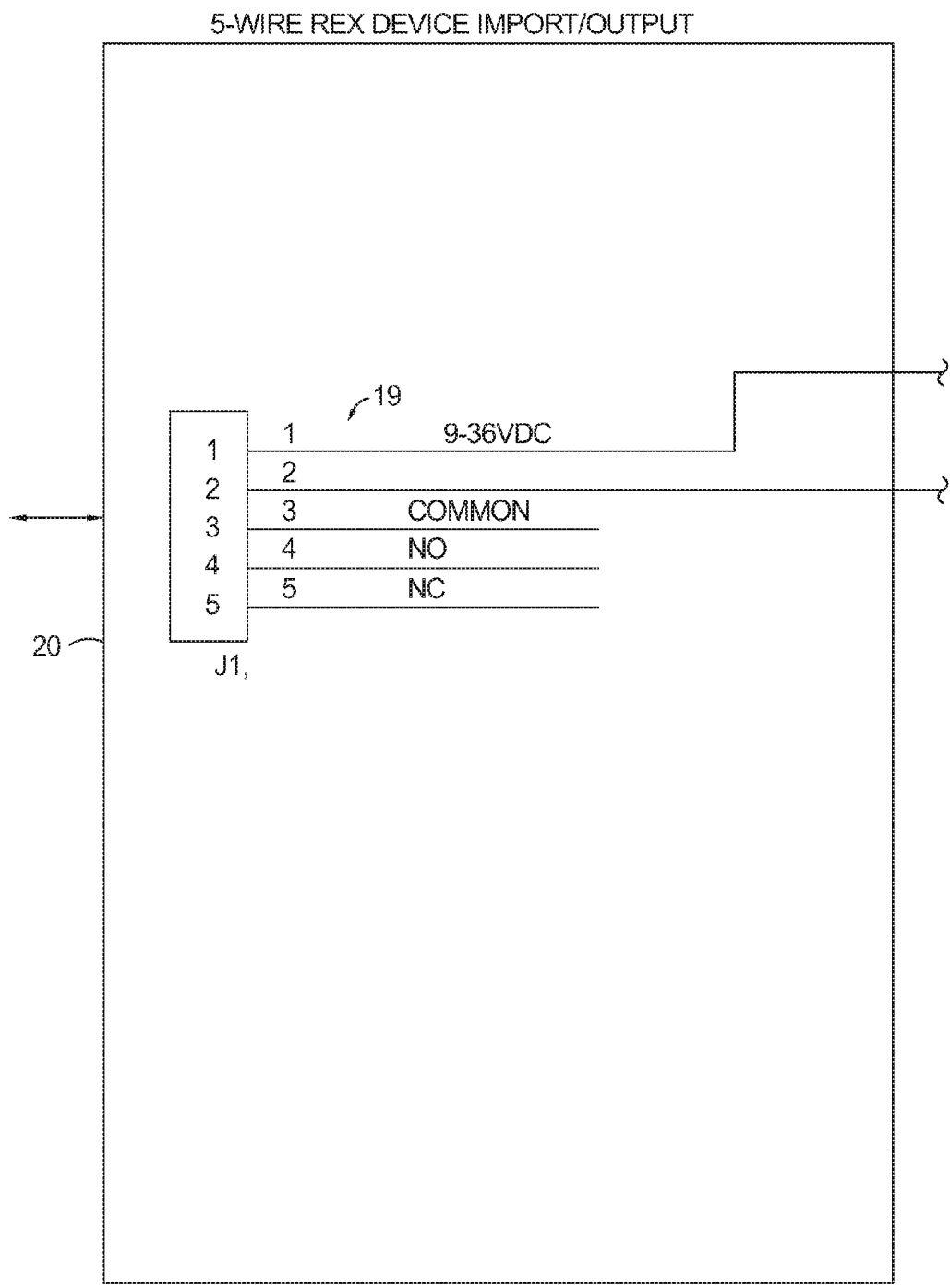
FIGS. 2-2P show a schematic diagram of an exemplary circuit of the REX activation detection and control module system of FIG. 1.
Figure 2B:
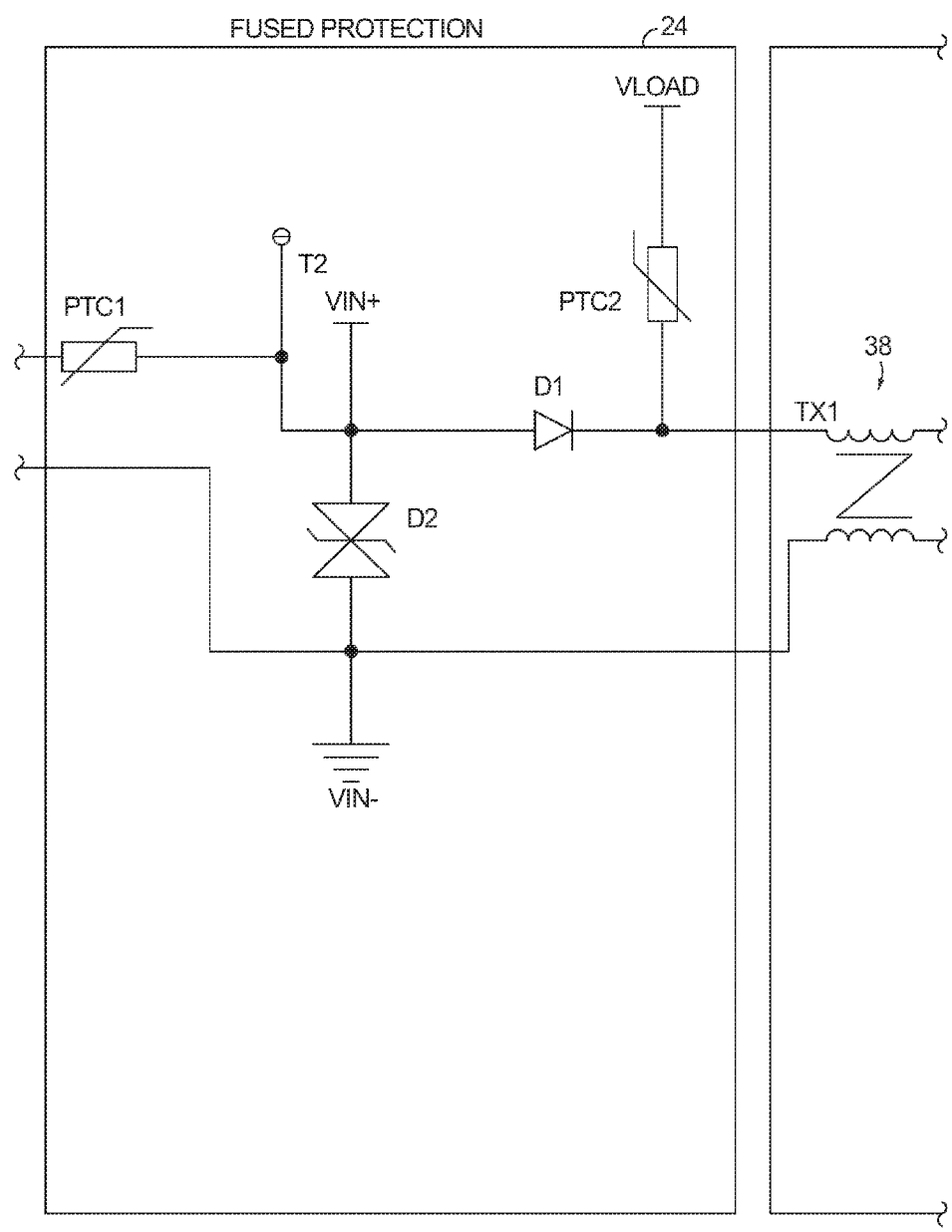
Figure 2C:
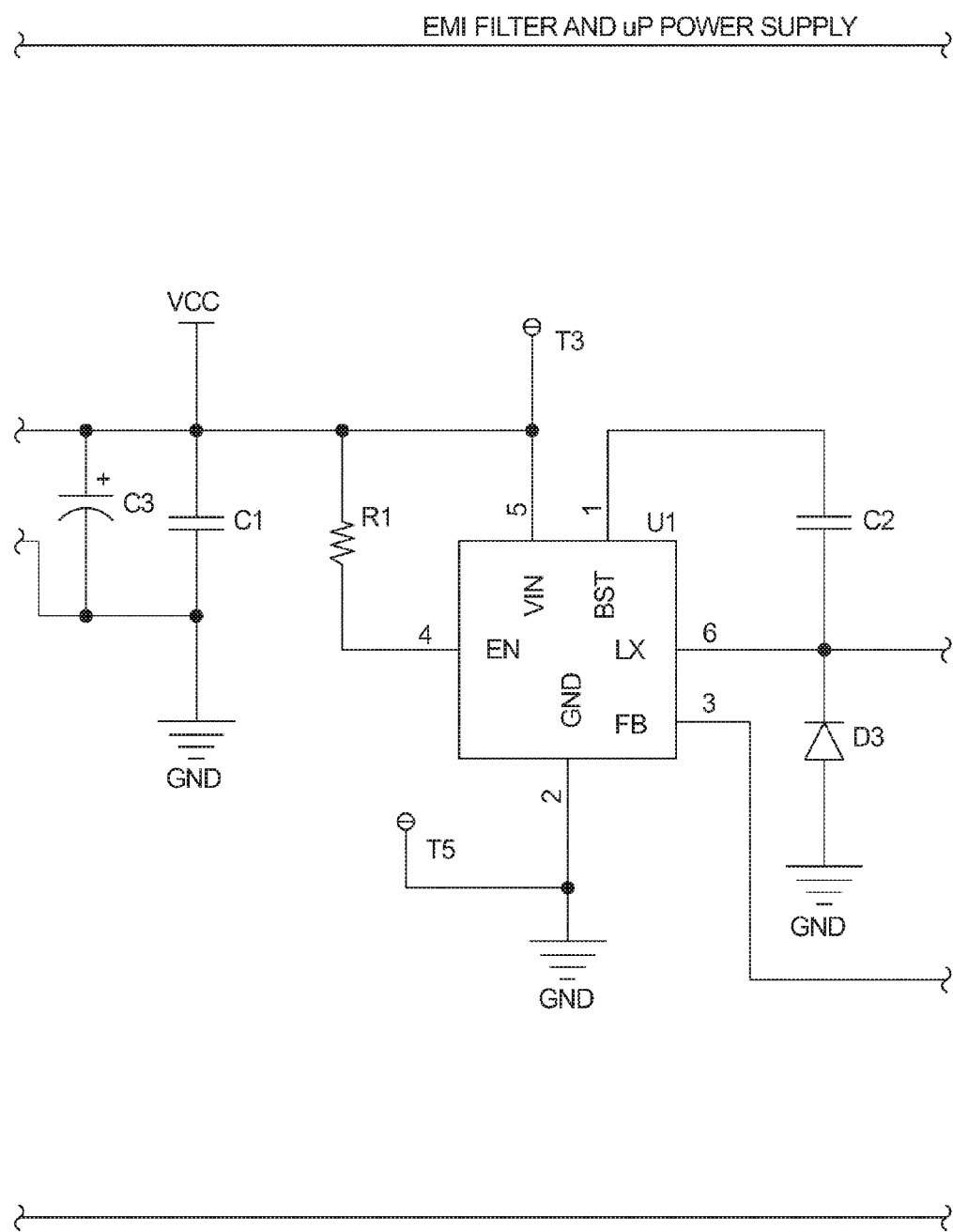
Figure 2D:
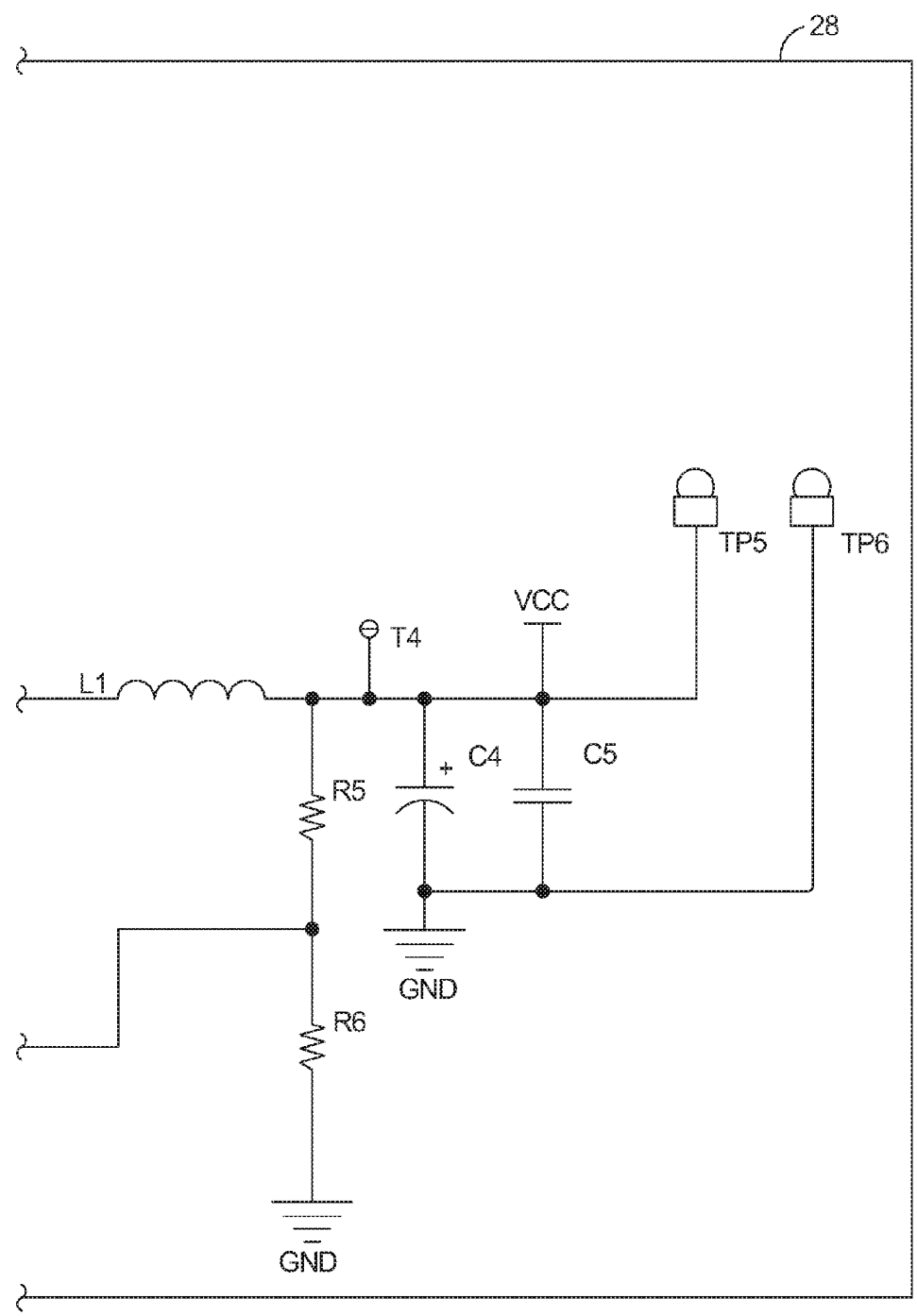
Figure 2E:
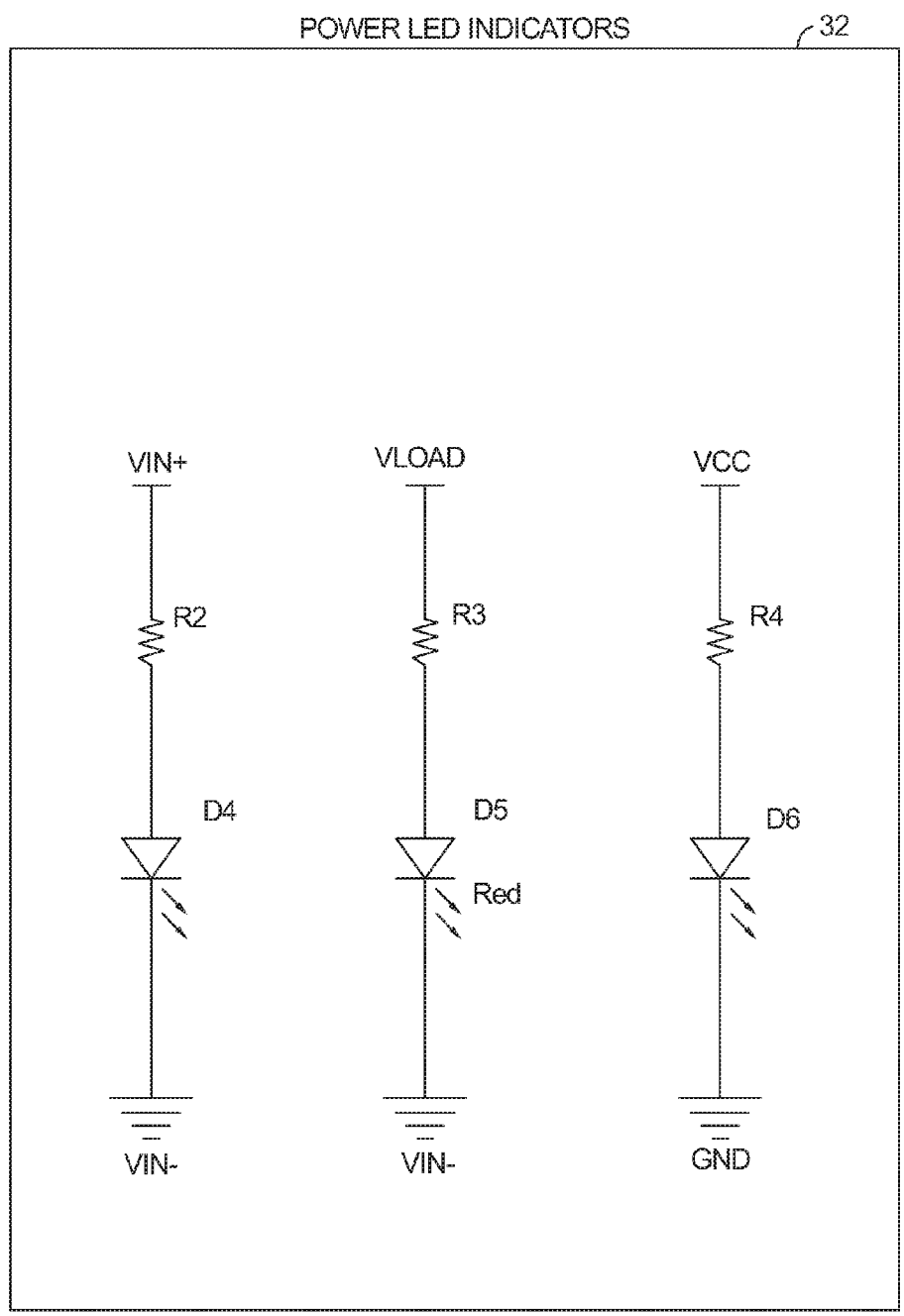
Figure 2F:
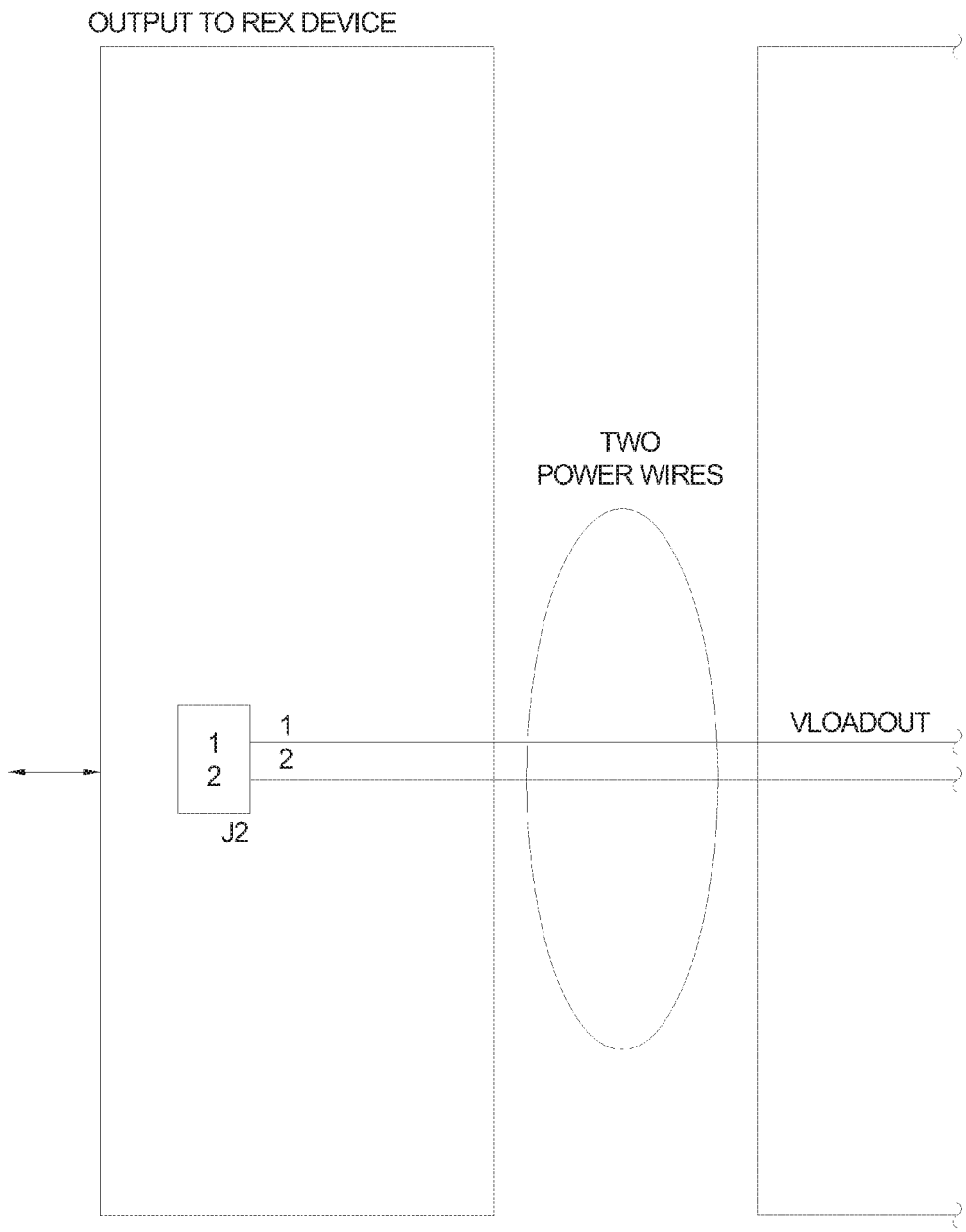
Figure 2G:
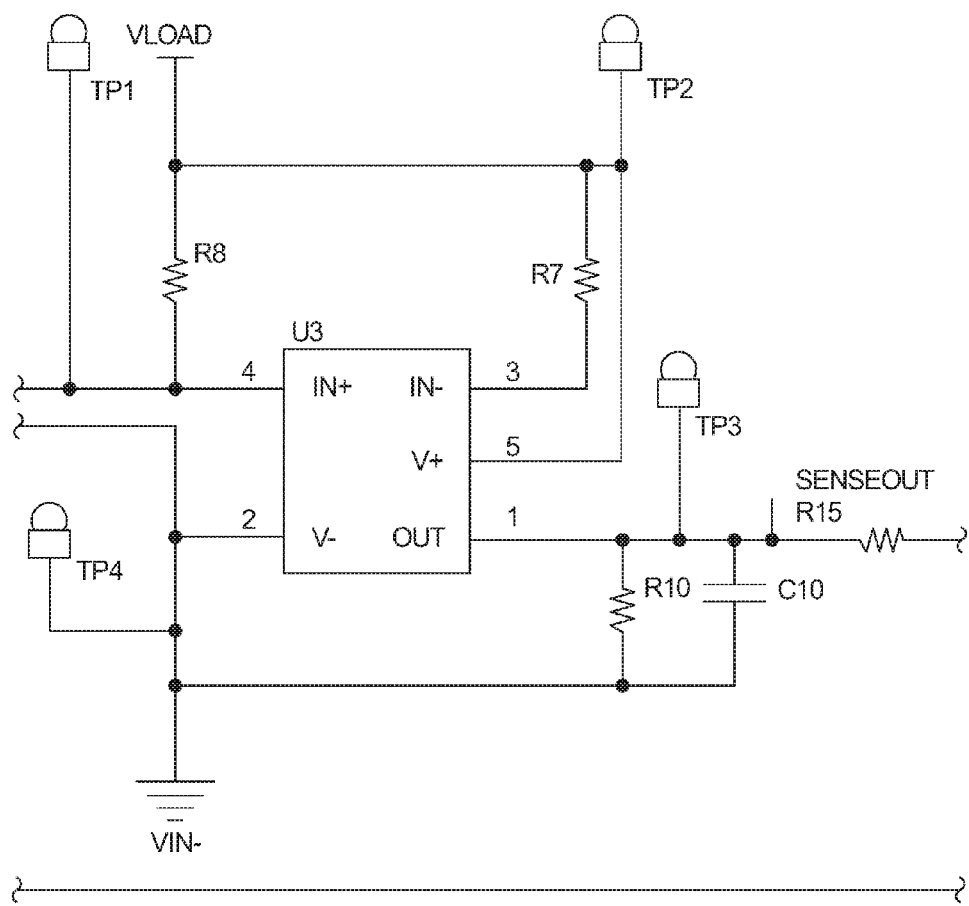
Figure 2H:
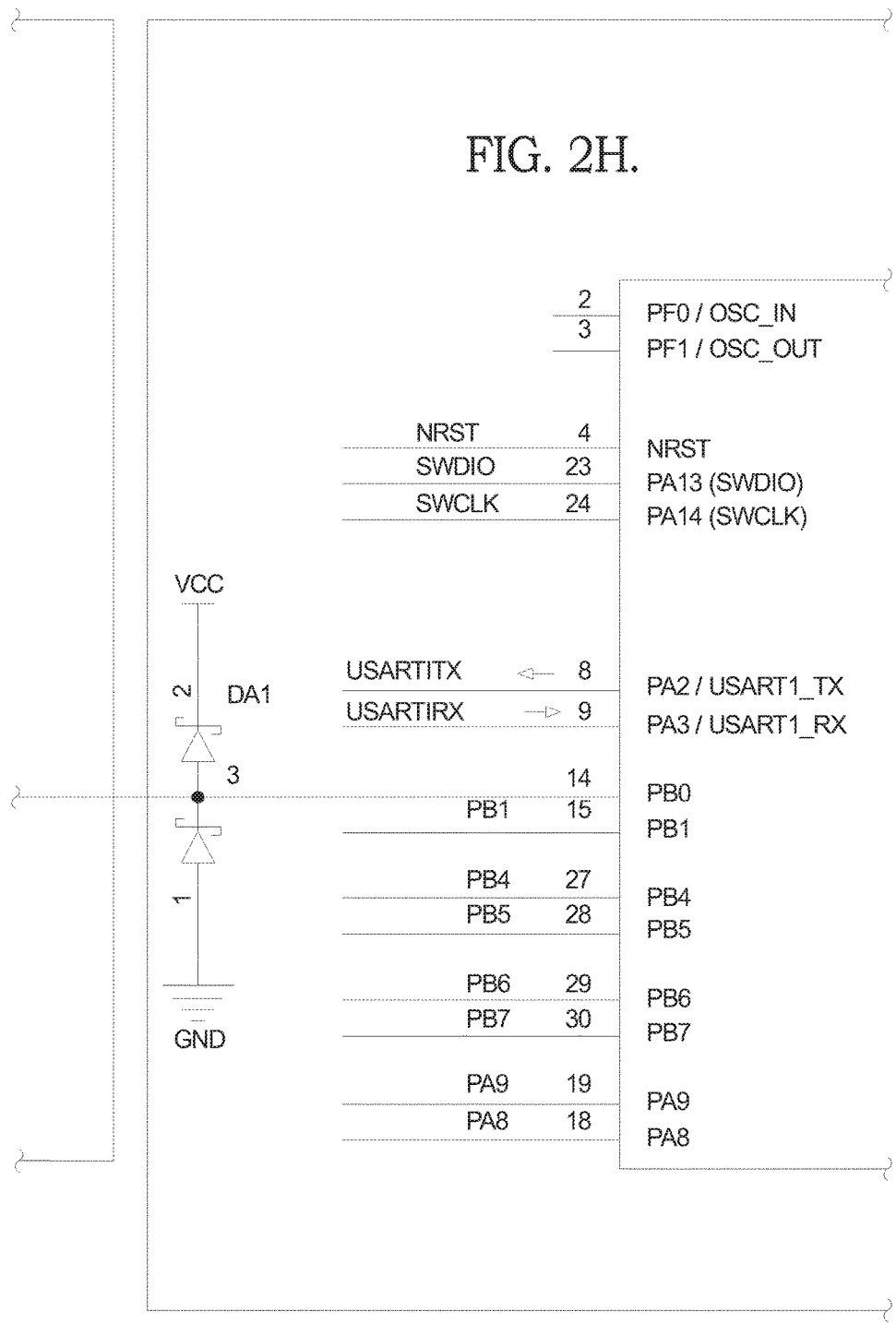
Figure 2I:
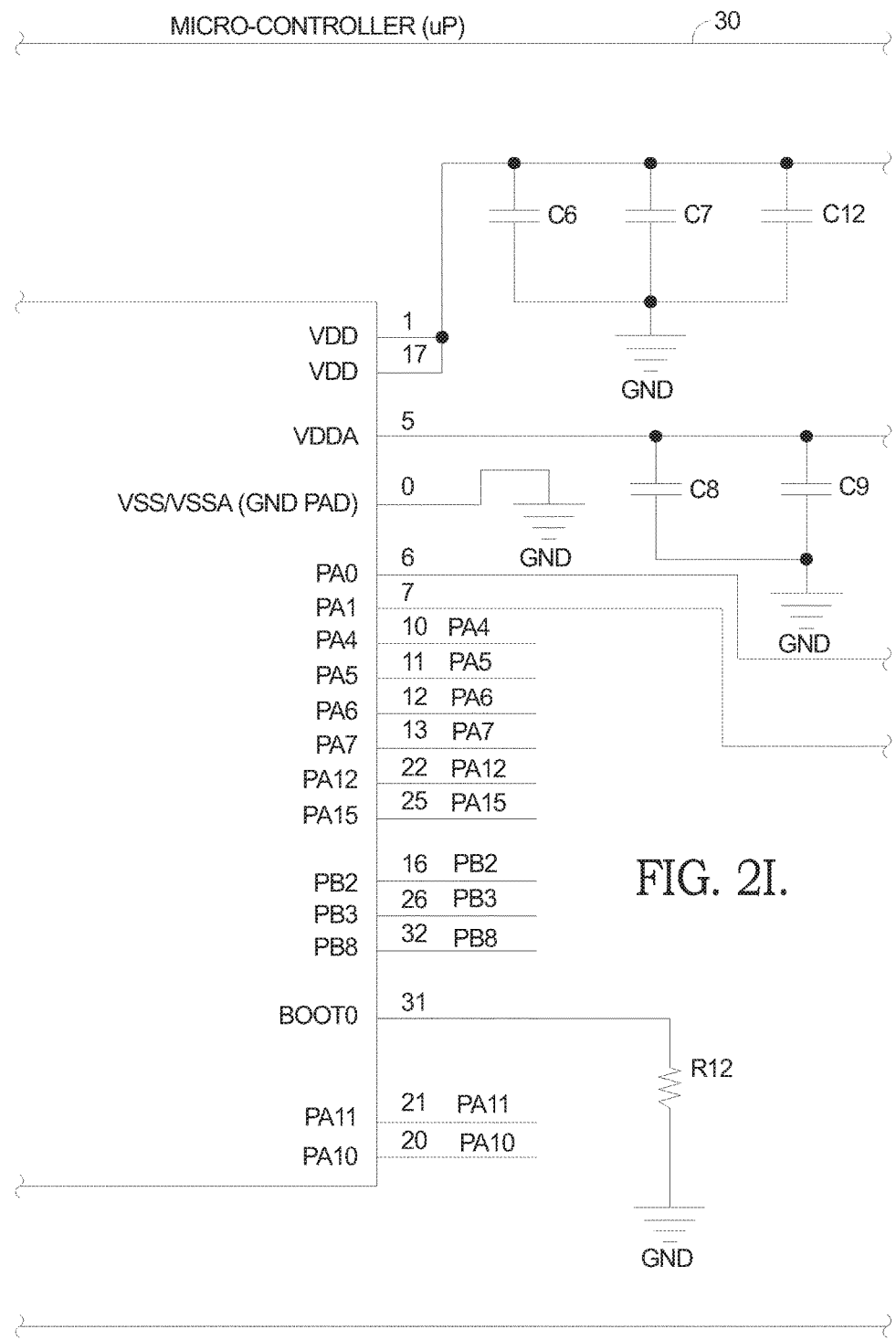
Figure 2J:
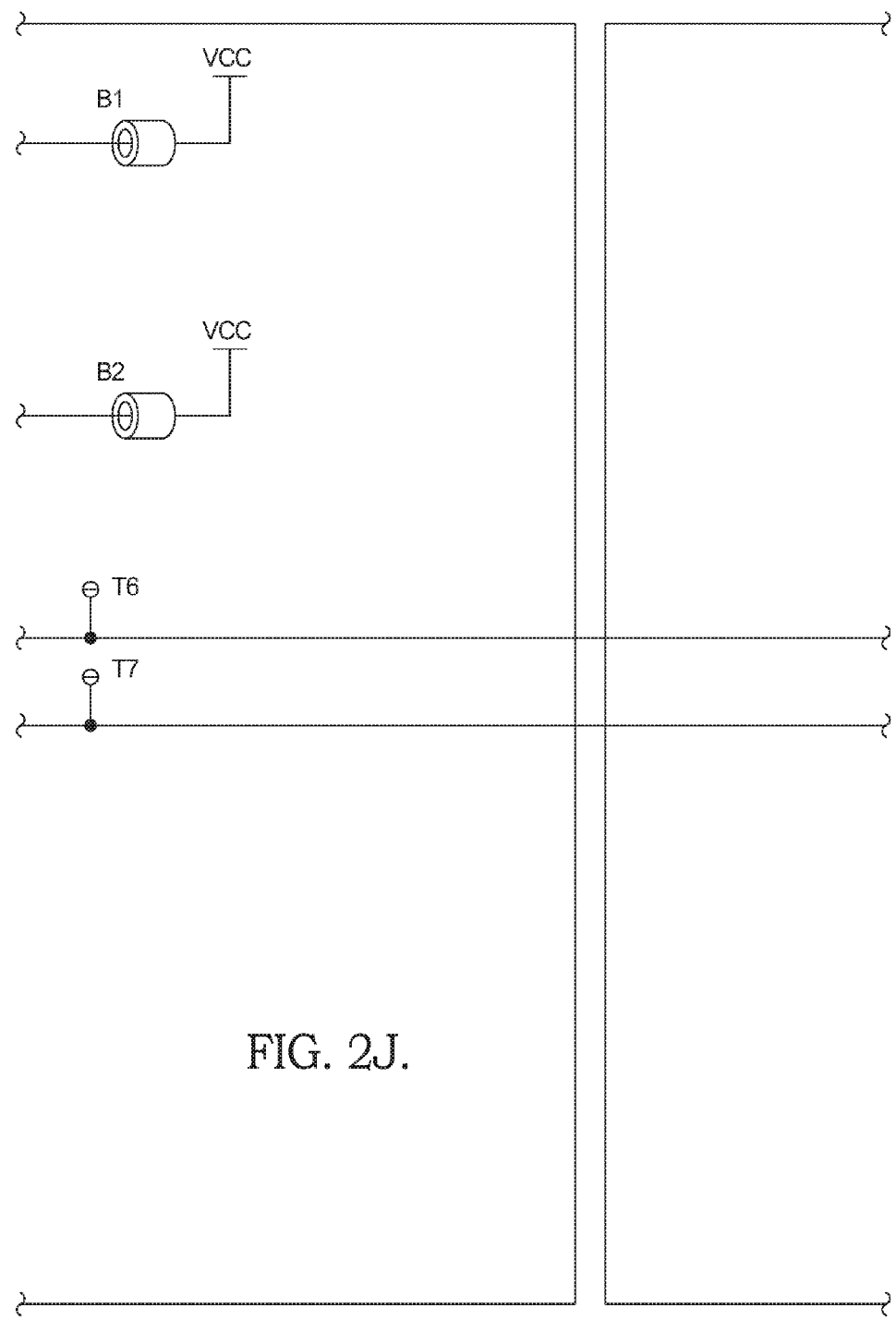
Figure 2K:
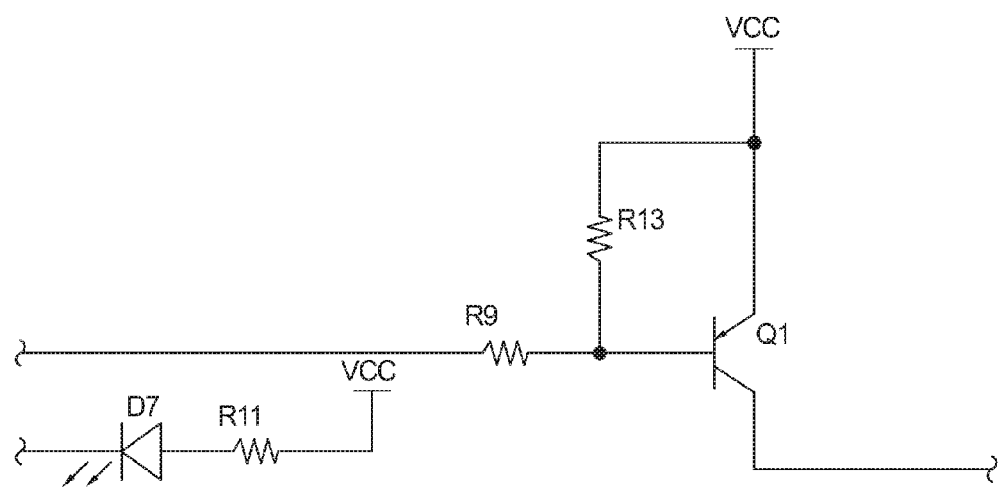
Figure 2L:
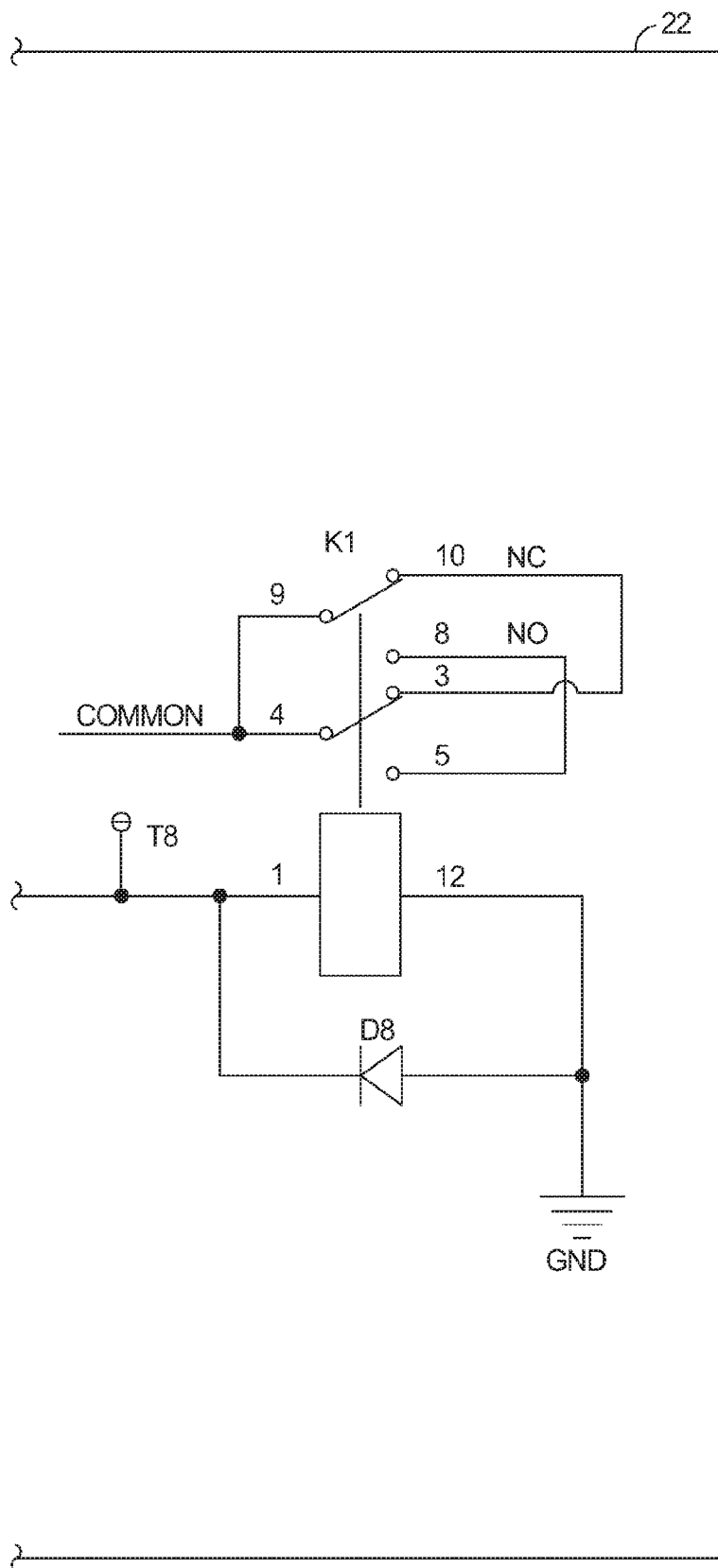
Figure 2M:
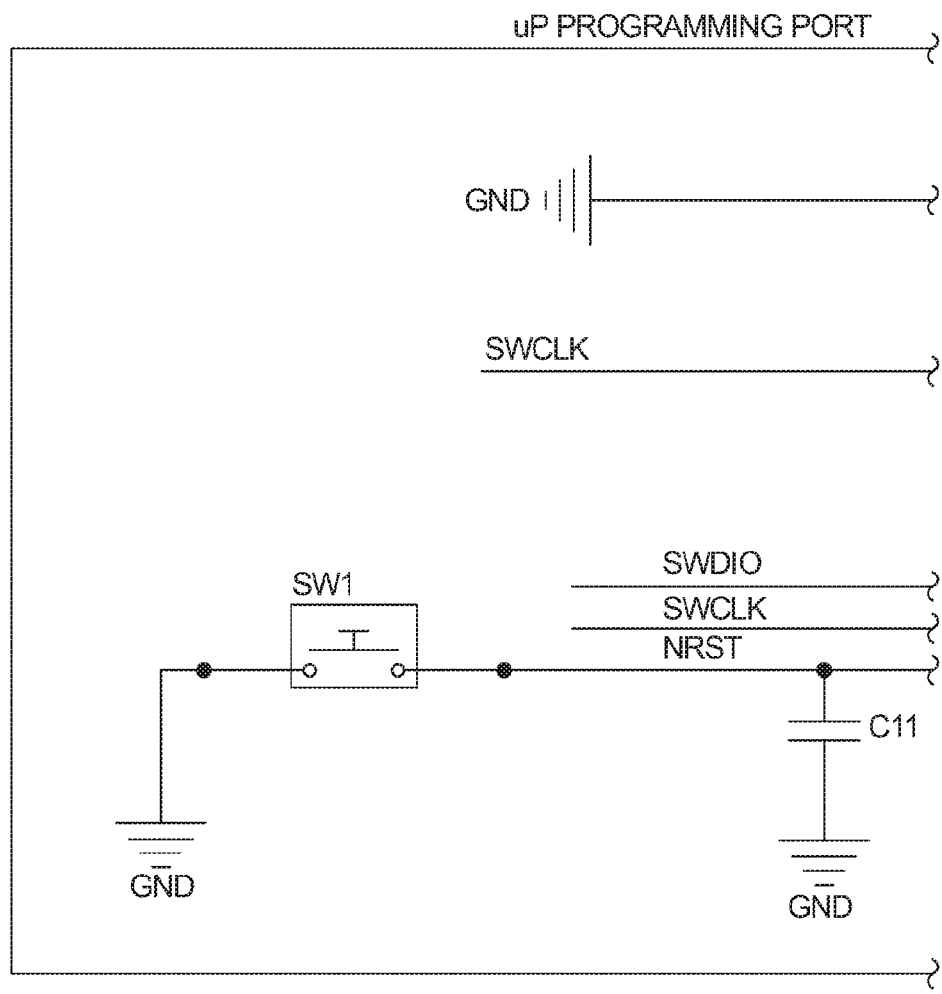
Figure 2N:
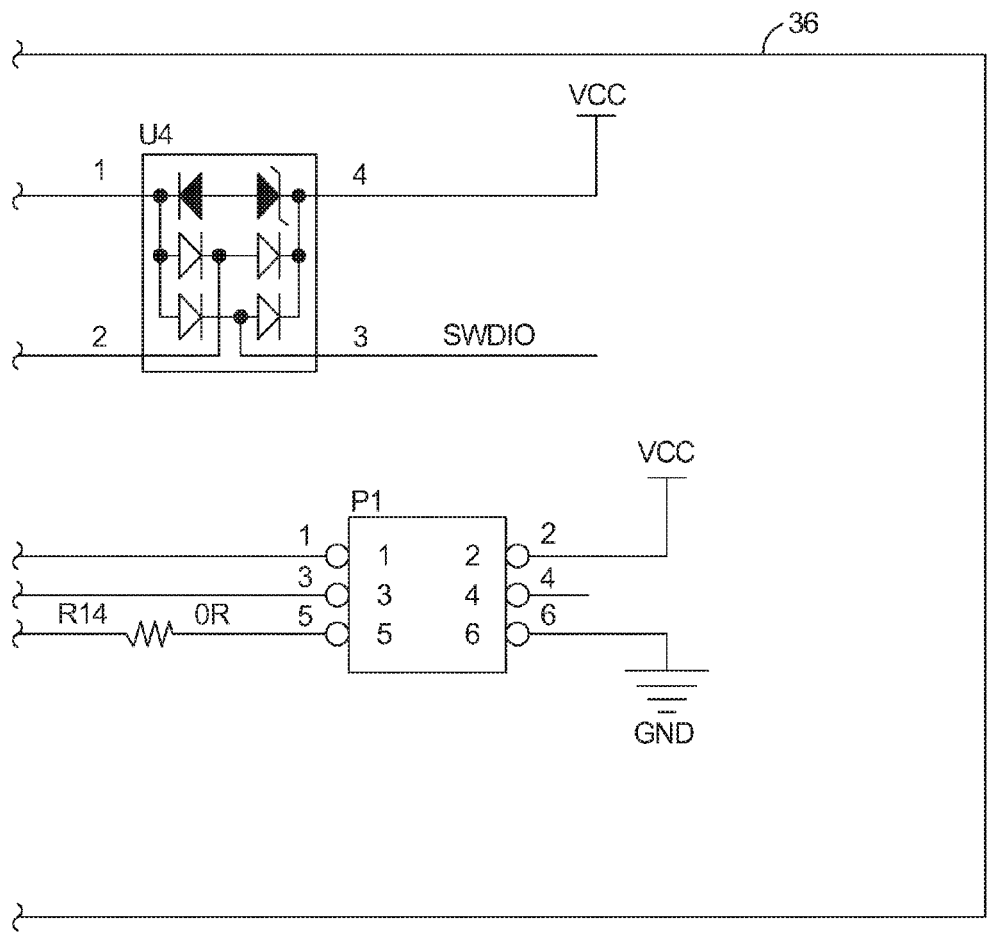
Figure 20:
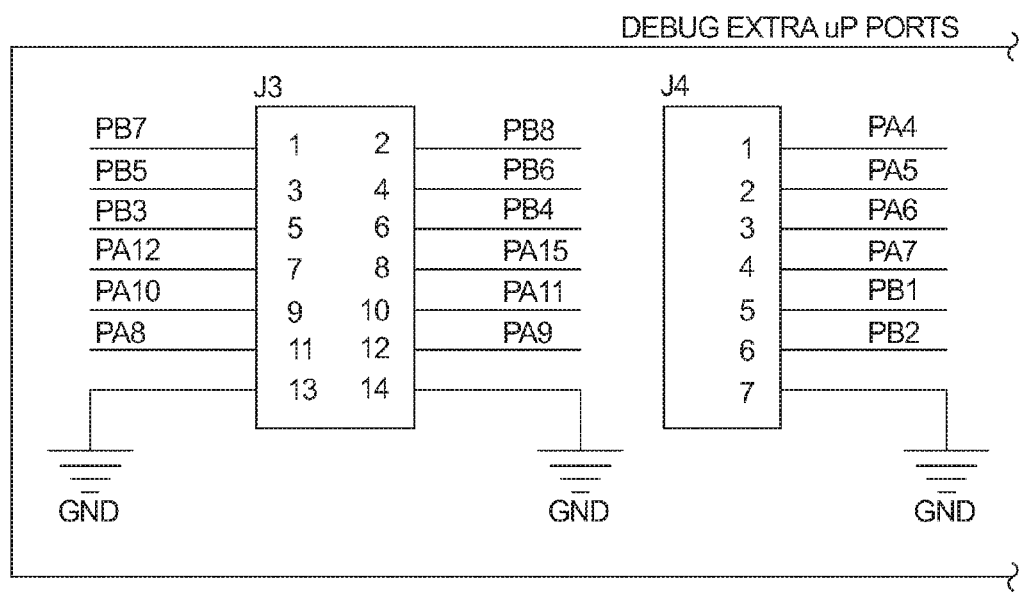
Figure 2P:
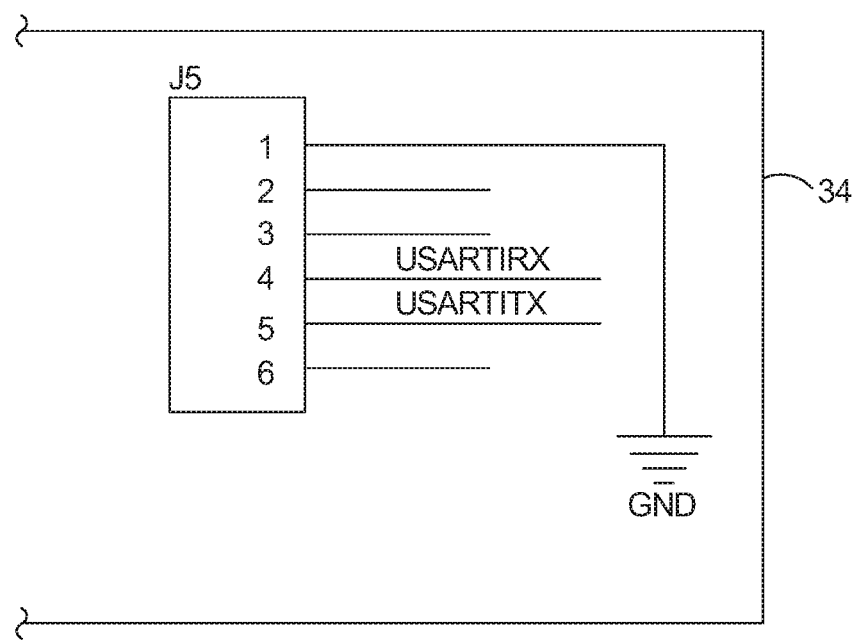

Referring now to FIGS. 2-2P, a schematic diagram of an exemplary system is also indicated by the reference numeral 10. The couplings J2 of first REX input/output device 18 (DC positive and DC negative) are electrically connected to the current sense amplifier 26 circuit. The current sense resistor R8 and the current sense amplifier IC chip U3 ("amplifier") operate in conjunction to actively measure the current through the terminals. Certain frequencies of the current output at the OUT pin on amplifier U3 may then be filtered by resistor R10 and capacitor C10. When electric power is being delivered to the current sense amplifier 26 via uP Power Supply IC chip U1 (hereinafter "power supply chip"), current may also be delivered to and illuminate diode D5 of the Power LED Indicators 32, so as to indicate the operational status of the REX device 16. It should be noted that test points TP1, TP2, TP3, and TP4 may be incorporated into the circuit to allow a user to test the operational status of amplifier U3.

The output pin (OUT) of amplifier U3 is electrically connected to pin 14 (PB0) of the microprocessor IC chip U2 (hereinafter "microprocessor") of the microcontroller 30 circuit. It is microprocessor U2 which is programmed to create the rolling average of the measured current at the output of amplifier U3. Microprocessor U2 is also programmed to monitor this rolling average for any anomalies (i.e. any increases and/or decreases in the amplifier U3 current output having time duration long enough to substantially and temporarily change this rolling average). Pin 6 (PA0) may be electrically connected to the base terminal of PNP transistor Q1. Pin 7 (PA1) may be connected to diode D7. Thus, when an anomaly is properly detected, microprocessor U2 will make a calculated decision to send current to transistor Q1, via pin 6, allowing transistor Q1 to turn on and enable current from the circuit's power rails/supply (hereinafter "VCC") to flow from the transistor's emitter lead through the collector lead and then activate the Form C dry contact relay K1. The microprocessor U2 may also send current to diode D7, allowing this diode to illuminate while the Form C dry contact relay K1 is activated. A programming port circuit 36 (comprising programming port P1 and steering diode array U4) may be connected to microprocessor U2 via pins 4, 23, and 24 (NRST, SWDIO, and SWCLK). This programming port 36 allows a user to upload system instructions into the microprocessor, whenever the needs of the system 10 require it.

Microprocessor U2 is powered by VCC via pins 1, 17, and 5 (VDD and VDDA). Current supplied to the VDD and VDDA pins may be filtered by digital filters B1 and B2 as well as the capacitors C6, C7, C12, C8 and C9. Microprocessor U2 may also be supplied calculated power through the power supply chip U1 via pins 2 and 3 (PF0/OSC_IN and PF1/OSC_OUT). It should be noted that two Schottky diodes DA1 may be inserted into the microcontroller circuit 30 to protect the VCC and ground (hereinafter "GND") from reversed voltage polarity. It should also be noted that the remaining pins of the microprocessor U2 may be electrically connected to a Debug/Extra UP Ports circuit 34 (hereinafter "debug circuit). The debug circuit 34 incorporates a number of debug ports J3, J4, and J5 that allow for simplicity of development and debugging of the microprocessor U2, during the manufacture of the system 10.

As shown, the Form C dry contact relay K1 is a combination contact having a Normally Open-Common-Normally Closed (NO-C-NC) configuration defaulted in the NC position (i.e. in a conductive state). Thus, when the microprocessor U2 turns on transistor Q1, the contact switches in the NC position are temporarily toggled to the NO position (i.e. in a non-conductive state). However, when the transistor Q1 returns to the off status (i.e. when the anomaly is over), the contact switches will return to the NC position. Toggling the contact switches to the NO position sequentially cuts power to the locking components (e.g. an electromagnetic lock) of the door in which the system communicates. As stated above, this allows egress through the door/doorframe.

To give back full functionality to the electrically connected ACS devices, the three contact leads, NO, Common, and NC, of the contact relay K1 are electrically connected with three of the couplings J1 of the second REX input/output device 20. The remaining two coupling leads (9-36 VDC) may be connected to a fused protection circuit 24. The coupling leads of coupling J2 may also be electrically connected to the fused protection circuit 24. The fused protection circuit 24 comprises a plurality of thermistors PTC1 and PTC2 and a transient-voltage-suppression diode that are made to protect the rest of the electronic components in the system 10 from a damaging amount of voltage exceeding the maximum 36 VDC threshold. When power may be delivered to the fused protection circuit 24 via coupling J1, current may also be delivered to illuminate diode D4 of the Power LED Indicators 32, so as to indicate the operational status of the ACS devices electrically connected to the system 10. The fused protection circuit 24 may be electrically connected to an EMI Filter 38. The EMI filter 38 is configured to remove any electromagnetic induction and/or electromagnetic radiation disturbances entering into the system 10. The EMI filter 38 may also be connected to the power supply chip U1. The power supply chip U1 is configured to allow the system 10 to support a continuous 9-32 VDC input range from the ACS devices without the need for any user selection or interaction. This may be accomplished by a small switching regulator that is incorporated into the power supply chip U1. It should be noted that test points TP5 and TP6 may be incorporated into the circuit to allow a user to test the operational status of power supply chip U1. It should be understood that the power supply chip U1 could be configured to allow the system 10 to support an input from the ACS devices that is less than 9 VDC and greater than 32 VDC.

Figure 3A:
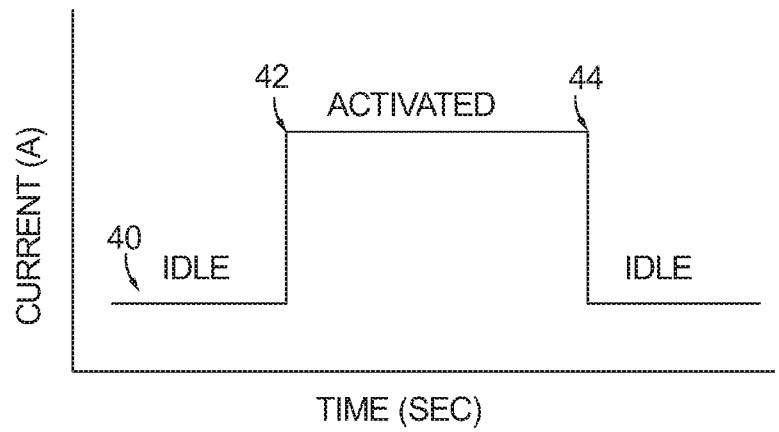
FIG. 3A is a Current vs. Time chart displaying an embodiment of the current profile at the input of the current sense amplifier.
Figure 3B:
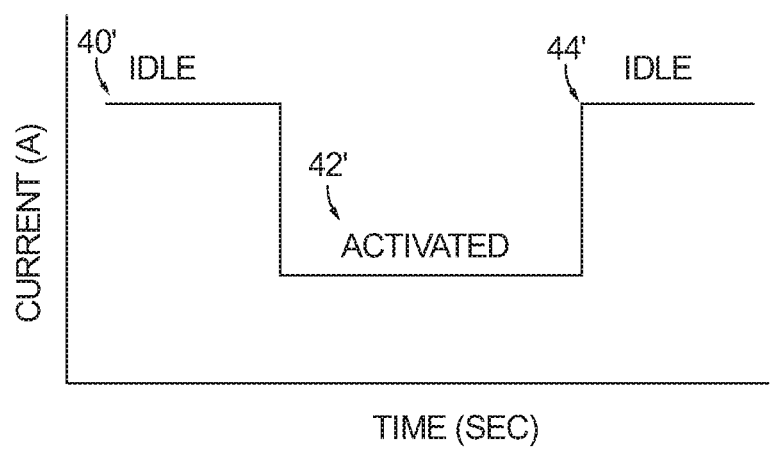
FIG. 3B is a Current vs. Time chart displaying another embodiment of the current profile at the input of the current sense amplifier.

Referring now to FIGS. 3A and 3B, in accordance with a further aspect of the present invention, the general profile of the current seen at the input of the current sense amplifier 26 (and which is equivalent to the measured current at the output) is shown. FIG. 3A reflects arrangements of the system 10 that the REX Device 16 induces a transitory and substantial increase in the measured current. Conversely, FIG. 3B reflects arrangements of the system 10 that the signal from the REX Device 16 induces a transitory and substantial decrease in the measured current. All other aspects between the figures remain equal. While the REX device 16 remains idle 40/40', the current being delivered to the input of the current sense amplifier 26 remains stable.

However, when the REX device is activated (i.e. an object's motion is detected/a user properly communicates an activation code), the current input changes to an activated state 42/42' (either an increase or decrease in current). When the activating event ends, the current input will return to the idle state 44/44'. As stated above, the microcontroller 30 is configured to monitor the rolling average of the measured current output from the current sense amplifier 26. So long as the activating event causes the duration of time of the input current's activated state 42/42' to be significant, the microcontroller 30 will activate the relay 22. If the activating event does not cause the duration of time of the activated state 42/42' to be significant (e.g. via slight current spikes or via false motion detection), the microcontroller 30 will not send a signal that sequentially activate the relay 22.

Referring generally back to FIG. 1, in accordance with yet a further aspect of the present invention, a method of electrically connecting ACS devices and of controlling ACS devices by REX detectors 16 via the system 10 comprises the steps of: i) providing the REX detector 16 (having two connectors); ii) connecting the REX detector 16 to the first REX input/output device 18; iii) delivering the current to the current sense amplifier 26; iv) measuring the delivered current via the current sense amplifier 26; v) monitoring the rolling average of the measured current output from the current sense amplifier 26 via the microcontroller 30; vi) delivering a signal to the current sense amplifier 26, so as to create an anomaly within the rolling average of the measured current; and, vii) activating the relay 22 upon detection of the anomaly by the microcontroller 30. This method may include the additional step of cutting off power to the system via the fused protector 24, when the voltage output from the first and/or second REX input/output devices 18/20 exceeds the maximum threshold. This method may also include removing electromagnetic induction and/or electromagnetic radiation disturbances in the system via the EMI Filter 28. This method may further include indicating the operational status of the system via a plurality of LED indicators (FIGS. 2 and 2E). It should be noted that the current delivered to the current sense amplifier 26 could be output from the first REX input/output device 18. It should be understood the steps of the method presented herein do not necessarily have to be in the order in which it is presented. It is also understood that when an element is referred to as being "on", "connected to/with", or "coupled to/with" another element, the element can be directly on, connected to/with or coupled to/with the other element or intervening elements may also be present. While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the following claims.

What is claimed is:

1. A request to exit (REX) activation detection and control module system configured to allow a REX device having at least four connectors to electrically connect with Access Control System devices having at least four connectors while only connecting two connectors to said REX device, said system comprising:
   a) a first REX input/output device comprising two couplings;

b) a second REX input/output device comprising at least four couplings, said second REX input/output device electrically connected to a relay;
c) a current sense amplifier electrically connected to said first REX input/output device, said current sense amplifier configured to measure current from said first REX input/output device;
d) a microcontroller electrically connected to said current sense amplifier, said microcontroller configured to monitor the rolling average of the measured current output from said current sense amplifier, said microcontroller connected to said relay; and
wherein when said microcontroller detects an anomaly within the rolling average of the measured current, said microcontroller will activate said relay.

2. A system in accordance with claim 1 wherein said system is located on a first side of a door frame.

3. A system in accordance with claim 1 wherein said relay is a Form C contact relay comprising:
a) a transistor electrically connected to said microcontroller;
b) a combination contact having a Normally Open-Common-Normally Closed (NO-C-NC) configuration set to default in the NC position, said combination contact electrically connected to said transistor; and
wherein said microcontroller toggles said combination contact to the NO position via said transistor.

4. A system in accordance with claim 2 further comprising a REX detector located on a second side of a door frame, said REX detector configured to send a signal to said first REX input/output device so as to create the anomaly within the rolling average of the current output.

5. A system in accordance with claim 1 further comprising a fused protector electrically connected to both said second REX input/output device and said current sense amplifier, said fused protector configured to cutoff power to said system when the voltage output from said first and/or said second REX input/output device exceeds a maximum threshold.

6. A system in accordance with claim 1 further comprising a programming port configured to allow a user to upload system instructions into said microcontroller.

7. A system in accordance with claim 1 further comprising a plurality of LED indicators configured to indicate the operational status of said system.

8. A system in accordance with claim 1 further comprising an EMI Filter configured to substantially remove electromagnetic induction and/or electromagnetic radiation disturbances in said system.

9. A system in accordance with claim 1 further comprising a power supply circuit configured to supply power to said microcontroller and said current sense amplifier.

10. A request to exit (REX) activation detection and control module system configured to allow a REX device having at least four connectors to electrically connect with Access Control System devices having at least four connectors while only connecting two connectors to said REX device, said system comprising:
a) a first REX input/output device comprising two couplings;
b) a second REX input/output device comprising at least four couplings, said second REX input/output device electrically connected to a Form C contact relay;
c) a current sense amplifier electrically connected to said first REX input/output device, said current sense amplifier configured to measure current from said first REX input/output device;
d) a microcontroller electrically connected to said current sense amplifier, said microcontroller configured to monitor the rolling average of the measured current output from said current sense amplifier, said microcontroller connected to said Form C contact relay, wherein when said microcontroller detects an anomaly within the rolling average of the measured current, said microcontroller will activate said Form C contact relay;
e) said Form C contact relay comprising:
i) a transistor electrically connected to said microcontroller;
ii) a combination contact having a Normally Open-Common-Normally Closed (NO-C-NC) configuration set to default in the NC position, said combination contact electrically connected to the collector of said transistor; and
wherein said microcontroller toggles said combination contact to the NO position upon sending current to the base terminal of said transistor;
f) a REX detector configured to send a signal to said first REX input/output device so as to create the anomaly within the rolling average of the current output;
g) an EMI Filter configured to substantially remove electromagnetic induction and/or electromagnetic radiation disturbances in said system; and
h) a plurality of LED indicators configured to indicate the operational status of said system.

11. A system in accordance with claim 10 wherein said system is located on a first side of a door frame and said REX detector is located on a second side of the door frame.

12. A system in accordance with claim 10 further comprising a fused protector electrically connected to both said second REX input/output device and said current sense amplifier, said fused protector configured to cutoff power to said system when the voltage output from said first and/or said second REX input/output device exceeds a maximum threshold.

13. A system in accordance with claim 10 further comprising a programming port configured to allow a user to upload system instructions into said microcontroller.

14. A system in accordance with claim 10 further comprising a power supply circuit configured to supply power to said microcontroller and said current sense amplifier.

15. A method of electrically connecting a request to exit (REX) detector having at least four connectors to devices having at least four connectors while only connecting two connectors to the REX detector via a REX activation detection and control module system, wherein said REX activation detection and control module system includes:
a) a first REX input/output device comprising two couplings;
b) a second REX input/output device comprising at least four couplings, said second REX input/output device electrically connected to a relay;
c) a current sense amplifier electrically connected to both said first REX input/output device and said second REX input/output; and
d) a microcontroller electrically connected to said current sense amplifier, the method comprising the steps of:
i. providing a REX detector having two connectors;
i. connecting the REX detector to said first REX input/output device;
ii. delivering a current to said current sense amplifier;
iii. measuring the delivered current via said current sense amplifier;

iv. monitoring the rolling average of the measured current output from said current sense amplifier via said microcontroller;

v. delivering a signal to said current sense amplifier so as to create an anomaly within the rolling average of the measured current; and vi. activating a relay upon detection of the anomaly by said microcontroller.

16. A method of electrically connecting REX detector of claim 15 wherein the current delivered to said current sense amplifier is output from said first REX input/output device.

17. A method of electrically connecting REX detector of claim 15 further comprising the step of cutting off power to said system via a fused protector when the voltage output from said first and/or second REX input/output device exceeds a maximum threshold.

18. A method of electrically connecting REX detector of claim 15 further comprising the step of removing electromagnetic induction and/or electromagnetic radiation disturbances in said system via an EMI Filter.

19. A method of electrically connecting REX detector of claim 15 further comprising the step of indicating the operational status of said system via a plurality of LED indicators.

* * * * *